C. A. KRAUS.
JOINT.
APPLICATION FILED SEPT. 8, 1910.
1,066,290.
Patented July 1, 1913.
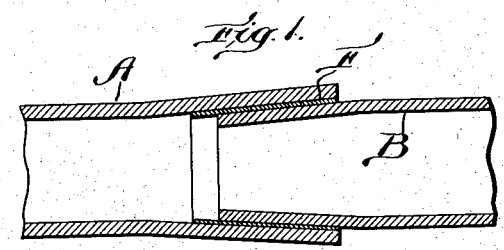
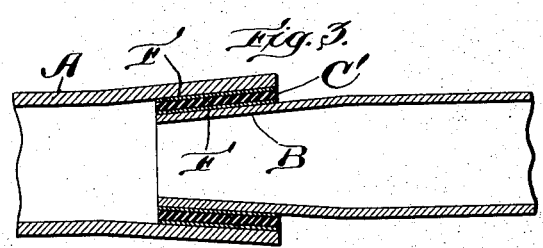

UNITED STATES PATENT OFFICE.

CHARLES A. KRAUS, OF NEWTON HIGHLANDS, MASSACHUSETTS.

JOINT.

1,066,290.   Specification of Letters Patent.   Patented July 1, 1913.

Application filed September 8, 1910. Serial No. 581,002.

*To all whom it may concern:*

Be it known that I, CHARLES A. KRAUS, a citizen of the United States, and resident of Newton Highlands, in the county of Middlesex and State of Massachusetts, have invented new and useful Improvements in Joints, of which the following is a specification.

My invention relates to the construction of joints between members of which one at least is metallic and has for its object the provision of a joint or seal comprising a metallic member which shall be adapted to such uses as the sealing of an electrode lead in a metal contained vacuum apparatus, such as a mercury arc rectifier. The requirements which must be fulfilled by such a joint or seal are that it shall be effectively insulating electrically, vacuum tight, and that it shall maintain these two qualities unimpaired in spite of large variations in temperature and electrical tension. Moreover, in order to be permanently effective such a seal or joint should possess ample mechanical strength, especially when applied to apparatus of large capacity wherein the weight and proportions of electrodes and their leads are such as to subject the joint to considerable mechanical stress.

Another object of this invention is to provide a joint which not only fulfils these requirements, but also involves the employment of one of the less expensive metals, for instance steel, as a component member of the joint or seal, so that such expensive metals as platinum (which has heretofore been the only metal practically available in the construction of gas-tight joints), may be dispensed with.

In particular, my object is to provide a permanent electrically sealed gas-tight joint for vapor electric apparatus of which the mercury arc rectifier is a type, and thus to make commercially possible the construction and operation of apparatus of this character and operation of apparatus of this character having far larger capacity than has heretofore been found practicable.

The mercury arc rectifier heretofore known to this art on the commercial side, has consisted of a glass rectifier container with platinum electrode leads sealed in its walls, and the fragility of such apparatus has imposed rigid limitations upon the designer and constructor, and even under the best conditions of operation has proved to be a fruitful source of breakage and loss. It has been proposed to make rectifier containers of steel and such metal-contained rectifiers have been described in Letters Patent, but so far as I am informed and in so far as I know by my personal experience, the description of such metal-contained apparatus has, in effect, amounted only to an assertion or suggestion that a metal container would be practically superior to the fragile glass container. Obviously a metal-contained rectifier can be practically effective only when permanent and efficient vacuum tight insulating joints are provided for the sealing in of electrode leads, and so far as I know, all of the descriptions and specifications suggesting metal containers for rectifiers, while mentioning the essential requirement of a vacuum tight insulating joint for electrode leads, have not suggested or specified how such a joint could be made. Mercury seals, cemented joints and mechanically ground joints have been suggested, but these according to my personal experience are not gas-tight under operative conditions in such apparatus, and are by no means capable of maintaining the essential efficiency under the mechanical stresses, thermal variations and electrical tensions which are incident to the operation of such apparatus, especially when large capacities are attempted.

The joint or seal hereinbelow described has demonstrated its permanent efficiency in actual practice having been employed in a system of metal-contained rectifiers to rectify continuously alternating currents of 500 amperes at 240 volts, and having been successfully tested for insulation up to 10,000 volts.

The precautions to be observed in the manufacture of my improved joint and the specifications to be followed in the manufacture of the joint in its preferred form are set forth and described hereinbelow in connection with the drawings which represent diagrammatically certain forms of joint, all of which embody the same fundamental principles of construction, in which—

Figure 1 shows in longitudinal section the joint in its simplest form; Fig. 2 shows in similar section a more elaborate form of joint, and Fig. 3 shows in similar section another variation of structure.

In all the forms herein illustrated, whether simple or complex, the joint or seal itself comprises two members, of which one at least is of metal, and therefore adapted to be joined to or form a part of a metal container for a rectifier or analogous apparatus, and an intermediary between the two joint members which is of such material that its contact with the metal member is an effective and intimate contact with the metal itself, as disinguished from the oxid of the metal and which, therefore, in the preferred instance where an oxidizable metal, such as steel, is employed as one member of the joint, is capable of dissolving the metal oxid, thus effectively cleansing and making contact with the metal itself as distinguished from the oxid. The contact between the intermediary and the other member is equally intimate for similar reasons if the other member be made of metal. If the other member be non-metallic, if for instance it be made of porcelain or lavite, the function of the intermediary as a solvent of oxids is not performed in respect to the non-metallic joint member; the non-oxidizable member presents to the intermediary such a surface that the intermediary makes intimate contact with the material itself of which the member is composed. To be more specific, referring to Fig. 1, the two members which are slid together to form the joint are represented by A and B, of which, let us say, A is a steel tube; the member B may be a tube of steel or other metal, or a tube of non-metallic material, such as porcelain or lavite. Between these two the intermediary F is interposed; this intermediary is a vitreous flux, plastic at easily obtainable temperatures and capable of dissolving metallic oxids which, if not present at first, will almost inevitably be formed on the metal surface during the process of making the joint. A composition which I have found effective for this purpose is described in a patent issued to me Nov. 8, 1910, No. 974,801, and consists of a vitreous homogeneous composition whereof the chief ingredients are soda glass, borax and ferric oxid, the last in proportion not less than 6% by weight in the composition. This composition is capable in the fluid or semi-fluid condition of dissolving the iron oxid which may form upon the surface of a steel member to which the vitreous composition is applied, so that in the act of application the vitreous intermediary cleanses the metallic surface and insures intimate and perfect contact between the vitreous intermediary and the metal itself without the intervention of any film of oxid which in the subsequent uses for which the joint is intended would be highly liable to impair or destroy its efficiency as a vacuum tight seal. Such a fluxing material represented by F is spread as evenly as possible over that portion of the member A which is to form part of the joint or seal. This may be done by raising the member A to the proper temperature, applying the fluxing material, and if need be evening it with a graphite pencil. The surface of such a fluxing material after it is applied will inevitably be irregular, and therefore the members of which the joint is composed should be so shaped and so brought together that the bubbles of air included between the fluxing material and the member which is applied to it shall be squeezed out and removed, because the presence of films of gas between the intermediary F and either member A or B of the joint are liable to impair its efficiency as a vacuum tight seal. Therefore, I make the joint members of such shape that when brought together there may be produced between them a progressively increasing pressure with a sliding movement of one member in the other, by means of which the flux itself is made to flow and redistribute itself and the gas bubbles are pressed out in advance of the entering joint member and at least so far eliminated that the fluxing intermediary finally constitutes a continuous unbroken belt or sleeve in intimate contact with both joint members entirely around the joint. For this reason, I form the meeting ends of the two members so that the one is tapered and the other flared preferably expressing this condition or relation by making the meeting ends conical, giving both the same angle of conicity so that they may mutually fit. My object may be accomplished by conical members of which the angle of conicity varies considerably; I prefer, however, to make the conical angle very slight, say about 5° from the axis for reasons hereinbelow to be set forth. In this connection I call attention to the quality possessed by the vitreous fluxing intermediary which in the operation of forming the joint is of importance and utility. Not only should the fluxing intermediary possess those qualities above mentioned, but it should also serve when in the fluid or semi-fluid condition as a lubricant between the two approaching joint members, so that no premature local adhesion between one portion and another of the joint shall take place; when they are being pressed together the two joint members should be capable of slipping into their final place. If premature local adhesion were permitted, further movement and pressure would be liable to distort or disarrange some one of the members which compose the joint or the intermediary between them, and thus tend to impair the final efficiency of the completed joint. The fluid and lubricant character of the fluxing intermediary thus enable it to fill the intersticies and compensate for irregularities in surface while performing the other functions herein mentioned.

Obviously the joint is formed by bringing its members together and maintaining a temperature which preserves the fluidity of the fluxing material while the constructive operation is in process. When the joint members and the fluxing intermediary have thus been brought into their intended permanent position, the joint is allowed to cool and at once, unless proper countervailing provisions have been adopted, the destructive stresses due to differences in thermal coefficient of expansion as between the several component parts of the joint, will assert themselves and render nugatory all the other precautions observed for the sake of producing an effective gas-tight seal. The structural features which are addressed especially to the prevention of such destructive effect are as follows: In the first place, while sufficient conicity is given to the joint members to effect the elimination of gas bubbles and the distribution of the fluxing intermediary, the several joint members are made so nearly cylindrical that stresses due to expansion and contraction are evenly and symmetrically distributed around the axis of the joint. Thus, theoretically the best compromise will be effected by forming the joint members with the least possible conicity consistent with the elimination of gas bubbles from the intermediary flux. Again, the materials of which the joint is composed should be so selected that the thermal coefficients of expansion of the several members, including the intermediary members, shall descend in value from the outermost to the innermost member in the seal of construction; or, if an inner member be composed of material which has a higher coefficient of expansion than a member surrounding it, that inner member should be so applied as to be held under a permanent stress which shall effectively offset or neutralize its tendency to separate by contraction from a surrounding member. Thus, if the member B of the joint shown in Fig. 1 be made of porcelain or lavite and the intermediary flux F be made of the vitreous homogeneous material above mentioned, and the member A be steel, the thermal coefficients of expansion of A, F and B respectively, will diminish in value in the order named, and consequently, the cooling of the joint after its initial construction will result in the exertion of compression by the outer member upon those within it, and so long as the outer member is not thereby stretched beyond its limit of elasticity, the joint will always be capable of retaining its efficiency throughout all the thermal variations to which it may be subjected while in use. If, however, the member B is, like the member A composed of metal, care should be taken after the joint is made to keep the member A hot while the inner members are kept relatively cool, and gradually to diminish the temperature of the member A so that the cooling of the outer member will produce in the member B a compressive stress which, when the temperature of the joint is again raised, as it will be in the process of use, this stress will be only relieved and the intimate contact between the component parts of the joint always maintained.

If a higher degree of electrical insulation than will be provided by the joint composed as shown in Fig. 1 is desired, the forms shown in Figs. 2 and 3 may be employed. In Fig. 2 two metallic tubular members A' and B' form joints in all essentials such as described in connection with Fig. 1 with the two ends of the insulating separator C, the fluxing intermediary F being interposed between the conical mutually fitting surfaces of A' and B' on the one hand, and C on the other. The separator C may be of porcelain or lavite, and in order to maintain the vacuum tight quality of the entire joint, this member C should be glazed.

In Fig. 3 the separator C' is shown as a trunco-conical sleeve of insulating material interposed between the metal tubular members A and B, with fluxing material F in the two joints formed on the inner and outer surfaces of the separator C'.

In order to get the best results, I believe that the members of which such joints are composed should be perfectly conical in form; that is to say, should present a true circular cross section, but when I use the term "conical," I wish to be understood as meaning thereby so tapered or flared, as the case may be, as to obtain the hereinabove described results in forming the joint; obviously the true cone may be departed from without seriously impairing the efficiency of the joint.

Whether the condition be brought about simply by allowing a joint composed of members of which the thermal coefficients of expansion diminish from the outer to the inner member to cool at a uniform rate throughout, or whether an inner member having a higher coefficient of expansion has its rate of cooling relatively accelerated as above described while the outer member is kept hot, the final condition at normal atmospheric temperatures is one in which the outer members of the joint exert a compression upon the inner members, thus leaving a reasonably ample margin of safety within which the temperature of the entire joint may thereafter be raised without interrupting the effective compressive function of the outer member upon those within it.

It will be observed that in all the specific illustrations above described, the joint is formed by progressive slipping pressure between two conical, or substantially conical members, and for the production of joints to withstand the most arduous service, I prefer to use this mode and this resulting structure.

I claim:

1. In a joint, the combination of concentric lapping tubular members, of which the outer is of metal and the inner of non-metallic material having a lower coefficient of expansion than the outer member, and a relatively low melting vitreous material having a coefficient of expansion intermediate between those of the outer and inner members, fused between and in intimate contact with both the inner and outer members.

2. In a joint, the combination of concentric lapping tubular members of which the outer is of metal and the inner of non-metallic material having a lower coefficient of expansion than the outer member, and a relatively low melting vitreous material having a coefficient of expansion intermediate between those of the inner and outer members fused between and in intimate contact with both the inner and outer members, the outer metal member being normally sustained in a condition of tension by the inner member.

3. In a joint, the combination of conical members, mutually fitting, and a vitreous intermediary between them in intimate adhesive contact with both members continuously around the entire joint, the inner members of said joint being under compression at normal atmospheric temperatures.

4. In a joint, the combination of two members whereof one at least is composed of an oxidizable metal, said members being conical and mutually fitting, and a vitreous intermediary between the said members in peripherally continuous intimate contact therewith, the inner members of said joint being under compression at normal atmospheric temperatures.

5. In a joint, the combination of conical members, mutually fitting, and a vitreous intermediary between them in intimate adhesive contact with both members continuously around the entire joint, the thermal coefficients of expansion of the said members descending in value from the outer to the inner member of the joint.

6. In a joint, the combination of two members whereof one at least is composed of an oxidizable metal, said members being conical and mutually fitting, and a vitreous intermediary between the said members in peripherally continuous intimate contact therewith, the thermal coefficients of expansion of the said members descending in value from the outer to the inner member of the joint.

Signed by me at Boston, Massachusetts, this second day of September, 1910.

CHARLES A. KRAUS.

Witnesses:
 ODIN ROBERTS,
 ROY D. MAILEY.